United States Patent [19]

Propst

[11] Patent Number: 4,814,200

[45] Date of Patent: Mar. 21, 1989

[54] METHOD FOR RESTORING PAINTED SURFACE

[75] Inventor: John F. Propst, Garland, Tex.

[73] Assignee: International Flying Colors, Inc., Houston, Tex.

[21] Appl. No.: 933,785

[22] Filed: Nov. 24, 1986

Related U.S. Application Data

[63] Continuation of Ser. No. 769,364, Aug. 26, 1985, abandoned.

[51] Int. Cl.⁴ .............................................. B32B 35/00

[52] U.S. Cl. .................................... 427/142; 427/334; 427/387; 427/388.4; 427/409; 427/416; 427/421; 427/429

[58] Field of Search ............... 427/140, 142, 331, 334, 427/387, 388.4, 409, 416, 421, 429

[56] References Cited

U.S. PATENT DOCUMENTS

| | | | |
|---|---|---|---|
| 3,806,352 | 4/1974 | Kirsaeter | 427/416 |
| 3,930,069 | 12/1975 | Stephens | 427/142 |
| 3,971,864 | 7/1976 | Beestrice | 428/423 |
| 4,023,524 | 5/1977 | Goldfarb et al. | 118/301 |
| 4,046,934 | 9/1977 | Gustafson | 428/195 |
| 4,089,994 | 5/1978 | Mattsson | 427/140 |
| 4,201,799 | 5/1980 | Stephens | 427/142 |
| 4,265,663 | 5/1981 | Gilicinski et al. | 106/10 |
| 4,265,936 | 5/1981 | Prohaska | 427/40 |
| 4,273,808 | 6/1981 | Neirynck et al. | 427/140 |
| 4,358,510 | 11/1982 | Ito et al. | 428/463 |
| 4,372,991 | 2/1983 | Kendall | 427/140 |
| 4,451,522 | 5/1984 | de Vroom | 428/201 |
| 4,464,499 | 8/1984 | Umemoto | 524/230 |

FOREIGN PATENT DOCUMENTS

| | | | |
|---|---|---|---|
| 948935 | 6/1974 | Canada | 427/416 |
| 2211322 | 9/1973 | Fed. Rep. of Germany | 427/334 |
| 53-19359 | 2/1978 | Japan | 427/416 |
| 54-68785 | 6/1979 | Japan | 427/142 |
| 499392 | 4/1937 | United Kingdom | 427/416 |

*Primary Examiner*—Sadie Childs
*Attorney, Agent, or Firm*—Ben D. Tobor

[57] ABSTRACT

A method for restoring the finished appearance of a damaged area on a painted surface is disclosed. An aerosol mixture of color-matched paint is sprayed onto the damaged area and onto the undamaged painted surface bordering the damaged area. The wet paint deposit is then contacted with a film of wax. The excess paint and wax are wiped away before the paint deposit becomes tacky. The cavity within the damaged area is substantially filled with a deposit of color-matched paint, without a noticeable transition from the restored surface to the original painted surface. Curing of the wet paint deposit is accelerated by contacting the paint deposit with a synthetic polishing wax which includes siloxane.

6 Claims, 1 Drawing Sheet

METHOD FOR RESTORING PAINTED SURFACE

This is a continuation of application Ser. No. 769,364, filed Aug. 26, 1985, now abandoned.

FIELD OF THE INVENTION

This invention relates generally to a method for restoring the finished appearance of a painted panel member which has been chipped or scratched.

BACKGROUND OF THE INVENTION

External panel members of automobiles, boats, airplanes and the like are coated with one or more layers of paint to protect the underlying structure from environmental effects such as corrosion, oxidation and solar radiation. The protective paint coating may also provide a decorative appearance. Surface deterioration due to such long term causes may be corrected by sanding away the old finish and applying a new protective and decorative coating.

Such long term causes take effect gradually, and if the vehicle receives appropriate care with regular washing and waxing, the protective and decorative effects of the paint finish may last substantially the lifetime of the vehicle. However, the paint finish may be scratched or chipped during regular use of the vehicle as a result of flying rocks, bumping, or vandalism.

Quite frequently, when such paint finish damage occurs, there is no damage sustained by the underlying structure. However, the presence of one or more such damage areas may cause a disproportionate reduction in the resale value of the vehicle. Conventional repair of such damaged areas is so time consuming and the quality of the restoration so unpredictable that restoration of a limited area is impractical. Moreover, complete restoration of an otherwise acceptable paint finish is not warranted because of the cost.

DESCRIPTION OF THE PRIOR ART

According to conventional practice, a template or mask is superimposed over the damaged area with the damaged area being exposed through a window. Paint is then applied to the damaged area through the window, usually with the aid of a small brush. Although the paint color can be closely matched, the template window leaves an obvious pattern which detracts from the overall appearance of the paint finish. Moreover, it is difficult to apply the paint evenly, with the result that the pain in the repaired are frequently appears as a lump or bulge.

SUMMARY OF THE INVENTION

The present invention provides a method for restoring the finished appearance of a damaged area on a painted surface in which the damaged area is filled with a uniform layer or coating of paint in such a manner that the restored area blends smoothly with the bordering paint surface so that the template pattern effect is avoided. According to the method of the invention, an aerosol mixture of color-matched paint is sprayed onto the damaged area and onto the undamaged painted surface bordering the damaged area. The wet paint deposit is then contacted with a film of wax. The excess paint and wax air wiped away, leaving the cavity within the damaged area filled with a deposit of color-matched paint, and substantially without a noticeable transition along the restored surface/original painted surface interface.

Preferably, the wax contacting step is performed by wiping the paint deposit area with a towel which is saturated with a liquid wax preparation. For best results, the wax contacting and wiping steps are performed before the paint deposit becomes tacky.

The invention will be further understood by those skilled in the art upon reading the following detailed description with reference to the attached drawings.

DETAILED DESCRIPTION OF THE PREFERRED METHOD

Figure 1:
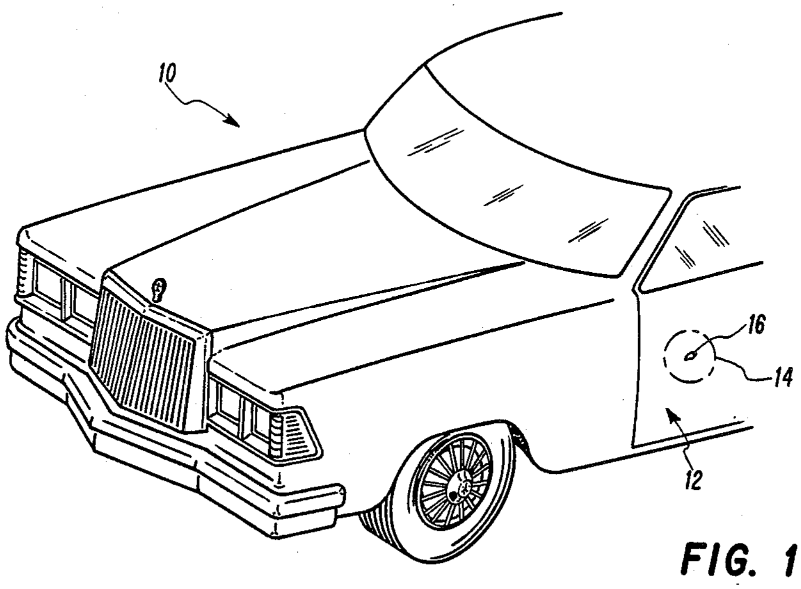
FIG. 1 is a perspective view of an automobile having a damaged door panel.
Figure 2:
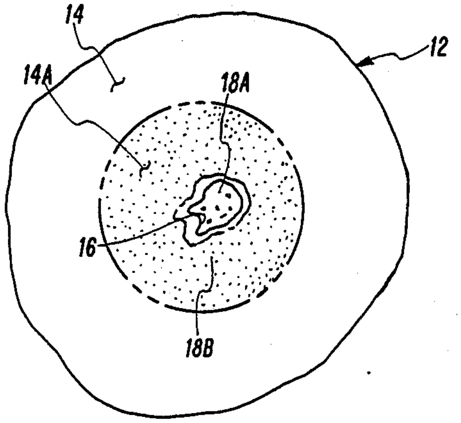
FIG. 2 is an enlarged view of the damaged panel area which is receiving an aerosol mixture of color-matched paint.

In the description which follows, like parts are indicated throughout the specification and drawings with the same reference numerals, respectively. The drawings are not necessarily to scale and the proportion of certain parts have been exaggerated to clarifly certain aspects of the invention.

Referring now to FIG. 1, an automobile 10 is equipped with a door panel 12 on which a protective paint coating 14 is applied. The painted surface area 14 is marred by the presence of a small cavity 16 which has been formed as a result of a sharp impact of the type produced by flying stone or engagement with the edge of an opening door of an adjacent automobile. Such cavities are generally irregular in outline, less than one centimeter in diameter and less than three mils in depth. The thickness of the paint layer depends upon the number of primer coats and finishing coats, but is typically less than three mils.

In preparation for restoration according to the present invention, the damaged surface area 14 is cleaned with an absorbant towel, with care being taken to remove oil and grit deposits within the cavity 16. Thereafter, an aerosol mixture of color-matched paint 18 is sprayed onto the damaged area 14 in a fine mist deposit 18A which substantially fills the cavity 16, with the panel surface area 14A bordering the cavity 16 being covered by an overspray 18B of aerosol mist. The result is a build-up of an aerosol mist of several mils thickness which substantially fills the cavity 16, and which blankets an annular surface area on the bordering panel structure.

Figure 3:
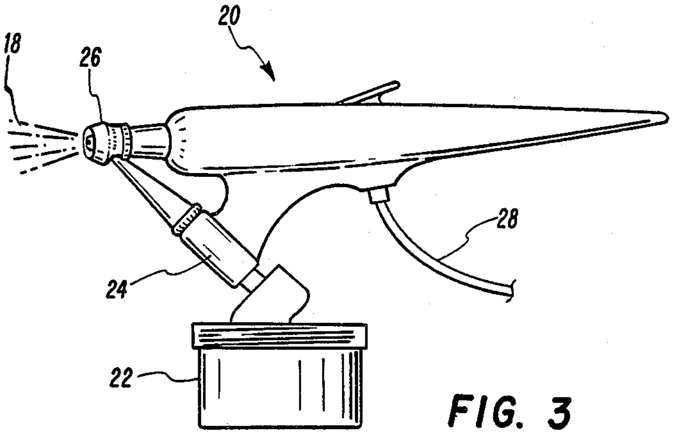
FIG. 3 is a side elevation view of an air brush which is delivering an aerosol spray of color-matched paint onto the damaged area of FIG. 2.
Figure 4:
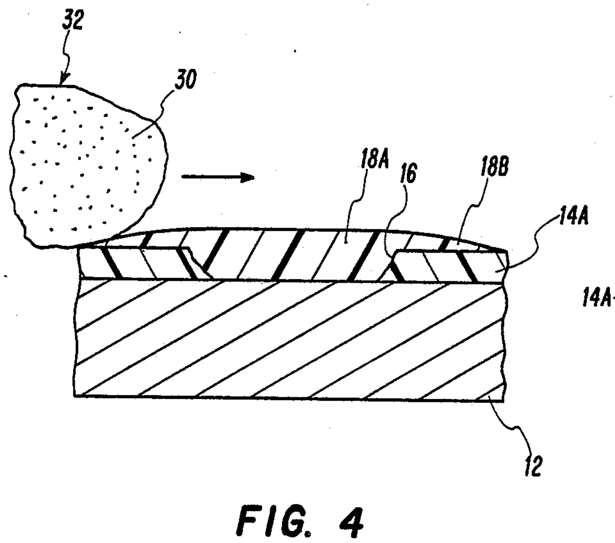
FIG. 4 is a sectional view which illustrates the preferred method for applying a film of wax onto the area of restoration.
Figure 5:
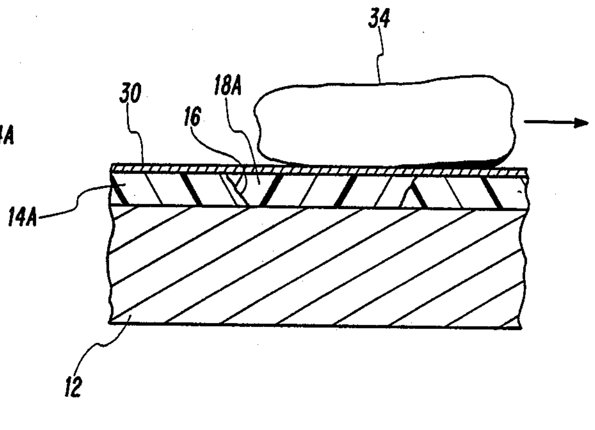
FIG. 5 is a sectional view which illustrates the removal of excess wax and paint.

Preferably, the aerosol mist 18 is produced by an air brush 20 as illustrated in FIG. 3. The air brush 20 is equipped with a paint reservoir 22, a needle valve 24 and a discharge jet 26. Compressed air is delivered through a conduit 28 through the jet 26. As air passes over the needle valve 24, the partial vacuum created draws the liquid paint 18 from the reservoir 22 into the air stream, with result that fine droplets of paint are ejected at high velocity through the jet and in a generally conical spray pattern. The diameter of the spray pattern and the rate of dispersion are closely controllable so that the extent of overspray 18B is limited.

A wet paint deposit 18A is defined by the paint received within the cavity 16 and the overspray paint 18B received onto the annular bordering surface area 14A. According to an essential aspect of the invention, the paint deposit is contacted with a film of wax 30. The wax 30 may be applied as an aerosol mixture, or, alternatively, it may be applied by wiping the paint deposit area with a towel 32 which is saturated with a liquid wax preparation. The wax contacting and wiping steps are performed with the deposited paint in wet condition, preferably before the paint deposit 18 becomes tacky.

After the paint deposit 18 has been contacted by the film of wax, the excess paint and wax are removed, preferably by wiping the waxed area with an absorbent towel 34. As a result, the cavity 16 within the damaged surface area 14A remains substantially filled with a deposit 18A of color-matched paint.

For certain restorations, I prefer to use an emulsion paint having an acrylic resin dispersion. I have found that a smooth transition from the restored surface to the original surface area is obtained and that the restoration deposit cures more rapidly when contacted by a synthetic polishing wax which includes siloxane. Siloxane is a straight-chain compound consisting of silicon atoms single-bonded to oxygen and arranged so that each silicon atom is linked with four oxygen atoms. Although the reaction is not completely understood at this time, I believe that the acrylic resin dispersion of the paint when contacted by the siloxane produces a curing reaction at the interface of the wax film and paint surface with the result that the curing process is accelerated about the wax/paint interface. The curing effect propogates rapidly throughout the restoration deposit 18A and is repeatable under a wide range of ambient conditions.

Although the invention has been described with reference to a preferred embodiment, and with reference to a specific wax preparation and a specific paint preparation, the foregoing descriptions should not be construed in a limiting sense. Various modifications of the disclosed method as well as alternative applications of the invention will be suggested to persons skilled in the art by the foregoing specification and illustrations. It is therefore contemplated that the appended claims will embrace any such modifications or embodiments that fall within the true scope of the invention.

I claim:

1. A method for restoring the finished appearance of a damaged area on a metallic painted surface comprising the steps of:

applying a deposit of color-matched paint into the damaged area and onto the undamaged painted surface bordering the damaged area;

contacting the paint deposit with a film of wax, while the paint deposit is wet; and, removing the excess wet paint and wax.

2. The method as defined in claim 1, wherein the wax contacting step is performed by wiping the wet deposit area with a towel which is saturated with said wax.

3. The method as defined in claim 1, wherein the excess paint and wax removal step is performed by wiping the waxed surface with an absorbent towel.

4. The method as defined in claim 1, wherein the paint is an emulsion paint having an acrylic resin dispersion, and the wax is a synthetic polishing wax comprising siloxane.

5. The method as defined in claim 1, wherein the paint depositing step is performed by spraying an aerosol mixture of said color matched paint onto the damaged surface area and onto the undamaged painted surface bordering the damaged surface area.

6. A method for restoring the finished appearance of a damaged ara on a metallic painted surface comprising the steps of:

applying a wet deposit of color-matched paint onto the damaged area and onto the undamaged paint surface bordering the damaged area;

contacting the wet paint deposit with a film of synthetic polishing wax which includes a dispersion of siloxane; and wiping the excess paint and wax away from the restoration area while the paint deposit is in wet condition.

* * * * *

UNITED STATES PATENT AND TRADEMARK OFFICE

CERTIFICATE OF CORRECTION

PATENT NO. : 4,814,200

DATED : March 21, 1989

INVENTOR(S) : John F. Propst

It is certified that error appears in the above-identified patent and that said Letters Patent is hereby corrected as shown below:

In Column 1, line 33, change "damage" to --damaged--.

In Column 1, line 51, change "pain" to --paint--.

In Column 1, line 66, change "air" to --are--.

Signed and Sealed this

Nineteenth Day of December, 1989

*Attest:*

JEFFREY M. SAMUELS

*Attesting Officer*

*Acting Commissioner of Patents and Trademarks*